UNITED STATES PATENT OFFICE.

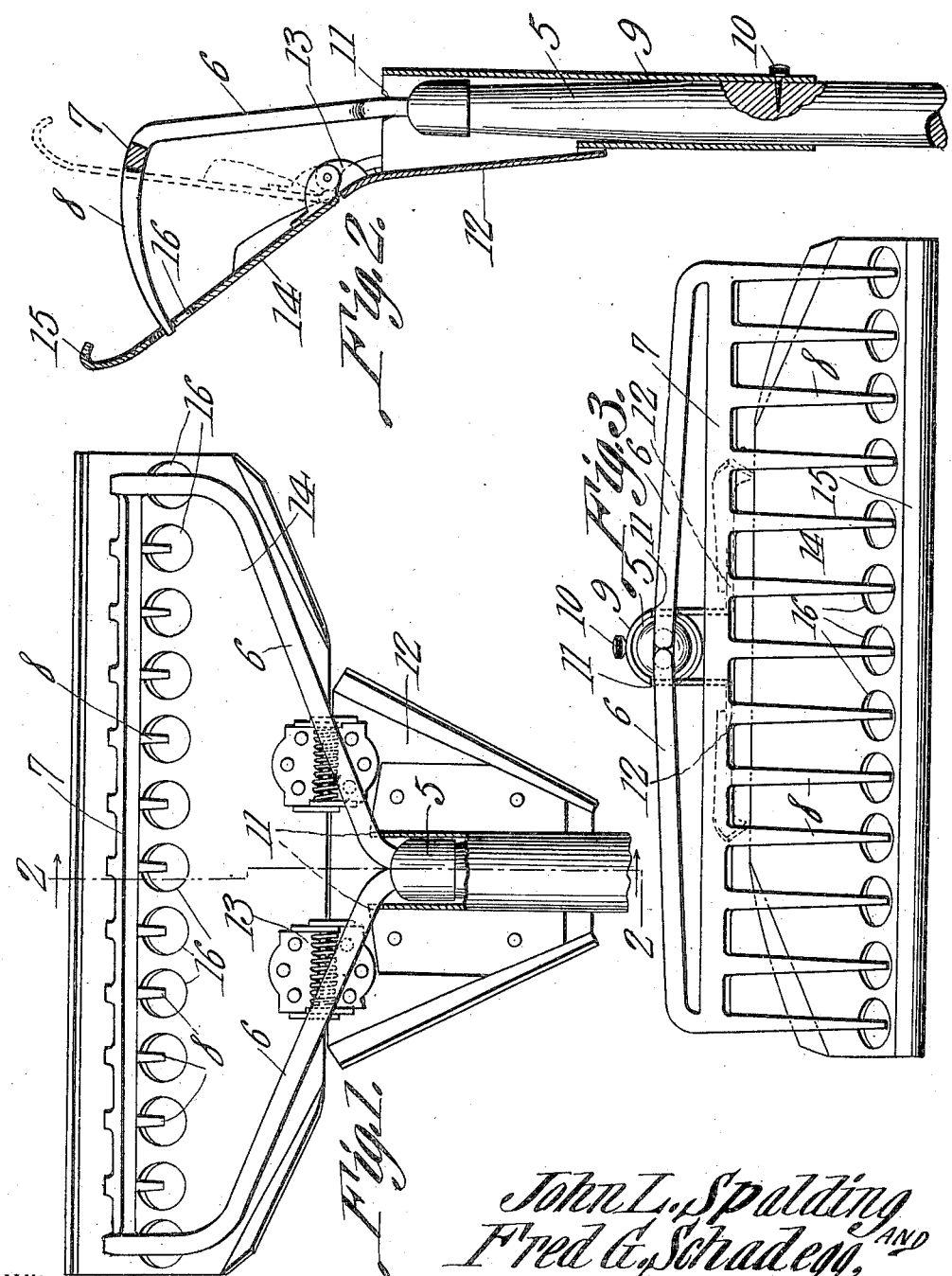

JOHN L. SPALDING AND FRED G. SCHADEGG, OF AITKIN, MINNESOTA.

RAKE.

972,031.   Specification of Letters Patent.   Patented Oct. 4, 1910.

Application filed May 21, 1910. Serial No. 562,625.

*To all whom it may concern:*

Be it known that we, JOHN L. SPALDING and FRED G. SCHADEGG, citizens of the United States, residing at Aitkin, in the county of Aitkin, State of Minnesota, have invented a new and useful Rake, of which the following is a specification.

It is the object of the present invention to provide an improved rake and more specifically to provide an attachment for an ordinary rake which will serve effectually as an automatic means for clearing the teeth of the rake.

More specifically; the invention aims to provide an attachment which will act automatically each time the rake is lifted from the ground, to clear the teeth of the rake of leaves and other accumulations.

The invention further aims to so construct the attachment that the clearing member thereof will have a tendency to regulate the depth to which the teeth of the rake may dig into the ground surface.

With the above and other objects in view, the invention consists in the general construction and arrangement of parts shown in the accompanying drawings, in which, Figure 1 is a top plan view of a rake embodying the present invention. Fig. 2 is a vertical sectional view therethrough, on the line 2—2 of Fig. 1. Fig. 3 is a front elevation of the rake and the attachment thereon.

In the drawings, the rake proper is illustrated as of ordinary construction and embodies the usual handle indicated by the numeral 5 and the bowed head 6 embodying the usual transverse tooth bar 7 and teeth 8 projecting downwardly therefrom.

The device embodying the present invention is in the nature of an attachment which, generally speaking, may be applied to any ordinary rake and is here shown as applied to a rake of the bowed head type. The attachment embodies, in its structure, a sleeve which is indicated by the numeral 9 and is fitted upon handle 5 of the rake and is held thereon by a thumb screw 10 which is engaged through an opening in the sleeve and is threaded into the handle. At its forward end, the sleeve is formed at diametrically opposite points with notches 11 in which notches engage the inner ends of the bows 6 of the head of the rake it being understood that the engagement of the bows in these notches serves to prevent turning or twisting of the sleeve, and the attachment as an entirety, upon the handle. A plate indicated by the numeral 12 is permanently secured upon the under side of the sleeve 9 at the front thereof and to this plate is hinged, as at 13, the rear edge of a tooth clearing plate indicated by the numeral 14. This plate 14 conforms in outline substantially to the outline of the head of the rake and is of sheet metal and flat throughout all portions except its forward edge at which edge it is bent or curved upwardly as at 15 so that this edge will not dig into the ground surface but may ride thereover in either direction. It will be observed that the plate 14 is formed with a transverse series of openings indicated by the numeral 16 and these openings are equal in number to the teeth 8 of the rake head and are so relatively spaced that one opening will be positioned at or directly beneath the point of each tooth. It will further be observed that the hinges 13 for connecting the plate 14 to the plate 12 are spring hinges and that as a consequence, the plate 14 is held normally in the full line position shown in Fig. 2 of the drawings in which position the teeth 8 of the rake head lie wholly above the plane of the plate.

When the rake is in use, and it is disposed upon the ground surface in the usual manner prior to drawing it over the surface, the tooth clearing plate 14 will be swung up to the dotted line position shown in Fig. 2 of the drawings thus exposing the teeth 8 so that the rake may perform its function in the usual manner. It will be readily understood that when the rake is lifted from the ground, the spring hinges 13 will immediately swing the plate 14 to full line position shown in Fig. 2 of the drawings and inasmuch as the rake teeth 8 have been engaged, in the dotted line position, through the openings 16 in the said plate 14, leaves and other accumulations upon the rake teeth will be cleared therefrom, automatically. It will further be understood that the force exerted by the springs of the hinges 13 will tend to prevent digging of the rake teeth into the ground surface to such degree as to injure the roots of plants or grass.

What is claimed is:—

The combination with a rake having a bowed head and teeth, of a sleeve fixed upon the handle of the rake and formed in its forward end with notches receiving the bows of the head, a plate hinged to the sleeve, springs pressing the said plate normally in one direction, the plate being formed with openings located one at the extremity of each tooth, the plate being movable against the tension of the spring, upon its hinges, to position with the teeth projecting through the openings.

In testimony that we claim the foregoing as our own, we have hereto affixed our signatures in the presence of two witnesses.

JOHN L. SPALDING.
FRED G. SCHADEGG.

Witnesses:
 OLOF A. OLSON,
 W. P. HAMMOND.